US006083590A

United States Patent [19]

Garzone et al.

[11] Patent Number: 6,083,590

[45] Date of Patent: Jul. 4, 2000

[54] THREE DIMENSIONAL EMBROIDERED WALL BORDER STRIP

[76] Inventors: Peter J. Garzone, P.O. Box 953, Travelers Rest, S.C. 29690; Rolf H. Strobel, P.O. Box 734, Marietta, S.C. 29661

[21] Appl. No.: 09/027,699

[22] Filed: Feb. 23, 1998

Related U.S. Application Data

[60] Provisional application No. 60/038,479, Feb. 24, 1997.

[51] Int. Cl.[7] .......... B32B 7/08; D05C 17/00; D04D 7/04

[52] U.S. Cl. .......... 428/40.1; 428/42.1; 428/32; 428/904.4; 428/906.6

[58] Field of Search .......... 428/32, 40.1, 42.1, 428/904.4, 906.6, 15, 37, 102, 913.3, 354; 442/151

[56] References Cited

U.S. PATENT DOCUMENTS

| | | | |
|---|---|---|---|
| 1,905,989 | 4/1933 | Safir et al. . | |
| 4,016,314 | 4/1977 | Cowans et al. | 428/35 |
| 4,071,387 | 1/1978 | Schlaepfer | 156/148 |
| 4,439,202 | 3/1984 | Sernaker | 8/471 |
| 4,900,604 | 2/1990 | Martinez et al. | 478/79 |
| 5,111,760 | 5/1992 | Garzone, Jr. | 112/439 |
| 5,413,870 | 5/1995 | Flood | 428/542.2 |
| 5,878,681 | 3/1999 | Asami | 112/475.18 |

OTHER PUBLICATIONS

Martin, Candi, "General Instructions For Counter Thread Cross Stitich," Candamar Designs, Inc. 1981.

*Primary Examiner*—Ellis Robinson
*Assistant Examiner*—Alicia Chevalier
*Attorney, Agent, or Firm*—Cort Flint; Henry S. Jaudon

[57] ABSTRACT

A decorative border strip for adorning room walls consisting of a three dimensional embroidered strip having a single layer of yarns inter-engaged in a weblike transparent repetitive pattern inter-engaging with multi-layered yarns interlaced to form non-transparent repetitive patterns. The border strip has a transparent adhesive strip secured with a rear surface thereof and a removable non-adhesive strip adhered to the exposed adhesive surface of the adhesive strip. When located on a wall, those wall portions behind the transparent pattern areas are visible.

4 Claims, 4 Drawing Sheets

THREE DIMENSIONAL EMBROIDERED WALL BORDER STRIP

This application claims the benefit of U.S. Provisional Application Ser. No. 60,038,479 filed Feb. 24, 1997 expired.

BACKGROUND OF THE INVENTION

The instant invention is directed to a three dimensional embroidered border strip which may be used to adorn selected areas of walls.

Decorative border strips are and have been well known for a very long time. Dimensional wall border strips are known as illustrated by U.S. Pat. No. 4,900,604. In this instance substrate sheets are attached to the wall. Self-adhesive appliques are removably attached to the substrate in selected positions. This arrangement is neither permanent nor formal.

The instant invention has for an object a decorative three dimensioned border strip which is formal in appearance and is permanent in design.

Another object of the invention is a wall border having a three dimensional pattern effect.

Another object of the invention is to utilize the beauty of embroidery in combination with a border strip.

Another object of the invention is the method of forming a decorative border utilizing an embroidered three dimensional border strip.

Another object of the invention is the provision of a decorative three dimensional border strip having transparent pattern areas.

SUMMARY OF THE INVENTION

The instant invention provides for a border strip for adorning walls which is formed of an embroidered strip having a face forming its outer surface. The embroidered strip includes a base fabric with transparent patterned areas which interconnect with single and multi-layered pattern areas. The multi-layered patterned areas comprise yarns inter-engaged to form repeating raised designs along the length of the strip. A transparent adhesive strip is adhered to an inner face of the embroidered strip. The adhesive strip is of a width conforming with the width of the embroidered strip and a removable strip is adhered with the exposed surface of the adhesive strip.

The transparent pattern areas include yarns inter-engaged with the base fabric about cutout areas forming non-transparent sections within the transparent areas. These non-transparent sections may comprise yarns interlaced to form a net. The net may be inter-engaged with the base fabric and with multi-layered pattern areas.

Certain non-transparent pattern areas are formed to be three layers. These three layered non-transparent pattern areas are interspersed throughout and are connected with the transparent pattern areas with the base fabric, and with the multi-layered pattern areas.

The invention includes the method of forming a three dimensioned decorative border along the wall of a room including the steps of: forming an embroidered strip to have a backing fabric of a single thickness with transparent design areas and non-transparent design areas; connecting additional yarns with the non-transparent areas designed to be of variable thickness over the backing fabric; forming a three dimensioned embroidered border strip by adhering a transparent adhesive strip with a support side of the embroidered strip to cover both the transparent and non-transparent pattern areas; applying a waterproof lacquer coating to the face of the embroidered strip; and, securing the three dimensional embroidered border strip to the wall forming the decorative three dimensional border.

DESCRIPTION OF A PREFERRED EMBODIMENT

Figure 1:
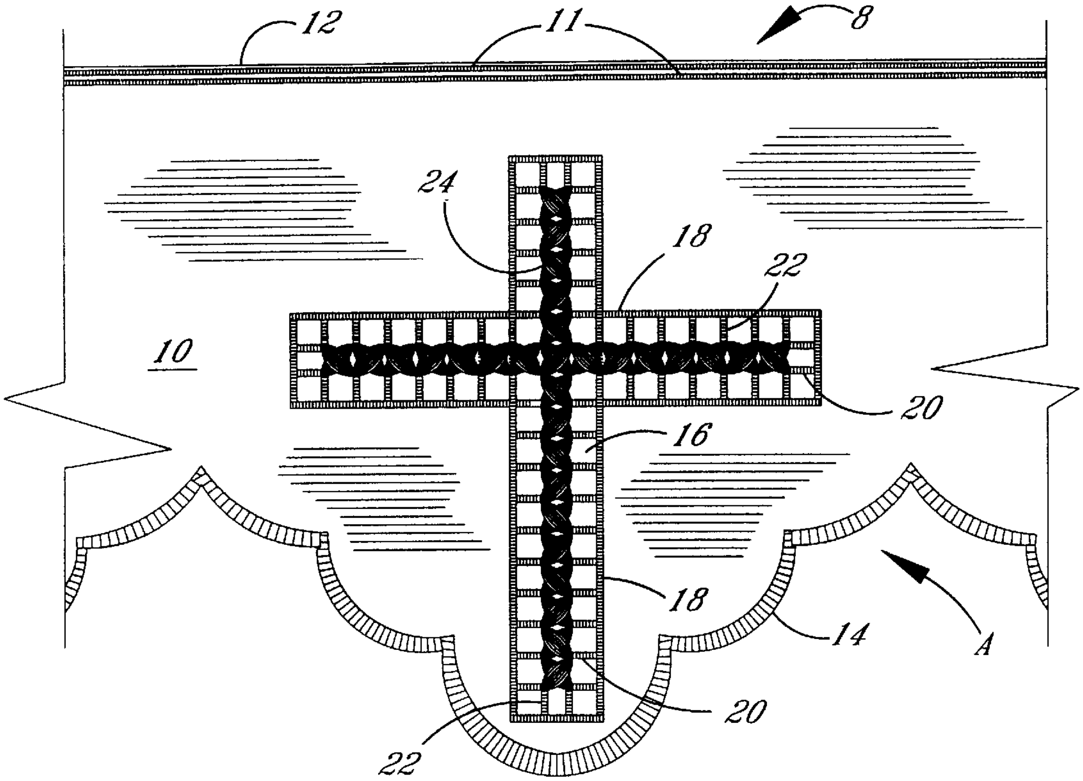
FIG. 1 is a sectional top view of all embroidered wall border strip of a selected repetitive pattern.
Figure 2:
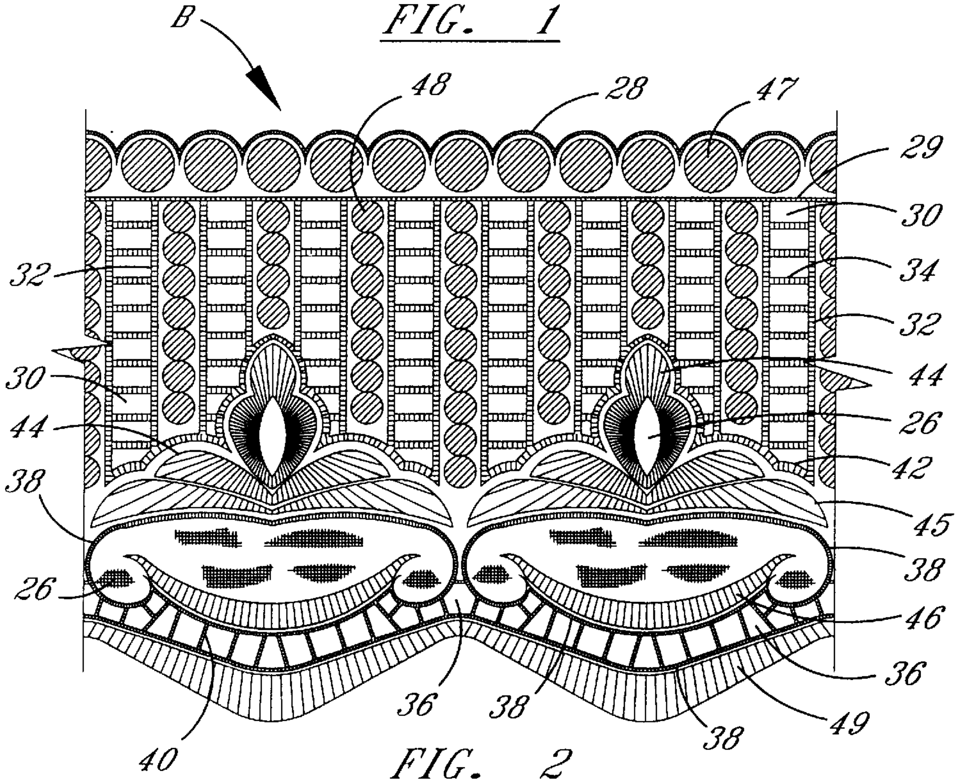
FIG. 2 is a sectional top view of an embroidered wall border strip of a selected alternative pattern.

Turning now to the drawings, FIGS. 1 and 2 show two selected designs forming embroidered wall strips A and B. The structure of the embroidery win be described first.

The embroidered structure, or strip 8 of wall strip A shown in FIG. 1, comprises a backing fabric which is preferably a single layered fabric formed of a plurality of interlaced or interwoven yarns. These forming yarns could be interlaced by knitting or by other known means. Backing fabric 10 is formed with a linear upper edge 12 and a sculptured lower edge 14. At evenly spaced intervals along the length of fabric 10, shaped cutouts or open areas 16 are formed. These cutouts are shaped as a cross. A first set of additional yarns are stitched or embroidered about the limits of each cutout 16 forming a multi-layer or two layered thickness for border 18. Also, these additional yarns are interlaced into multi-layered extensions or extensions of two thicknesses 20, 22 which extend transversely and longitudinally within the cutouts. Finally further additional yarns are interlaced or stitched onto extension 20, 22 forming a cross of a third layer or third thickness as shown at 24.

Along border 12 additional threads form a pair of embroidered longitudinal multi-layer or two thickness seams indicated at 11. Also, along edge 14 additional threads are stitched or embroidered with lace fabric 10 forming a multi-layered sculptured shaped edge.

It is emphasized that those areas of cutouts 16 not covered with threads forming border 18, extensions 20, 22 or cross 24 comprise see-through or open areas.

Turning now to FIG. 2 and the embroidered structure of embroidered of wall strip B. A backing fabric 26, which may be constructed as fabric 10, is provided forming a first layer of the embroidered strip. A sculptured upper border 28 along with a raised horizontal bead 29 are formed by interlacing or stitching a first group additional threads to the base fabric. A plurality of vertical cutouts or openings 30 of selected length are provided along the length of fabric 10. Vertical borders 32 and horizontal lattices 34 are also formed with the first group of additional yarns at a second thickness or layer. An additional cutout or punch-out 36 is sculptured adjacent the lower edge of fabric 26. Other threads of the first set of additional threads are interlaced with or stitched to the edges of cutout 36 forming multi-layer or two layer borders 38 which are interconnected with multi-layered, or two layer, lattice strips 40. Also formed at two layer thickness is sculptured lower border 42 which extends along the lower edge of cutouts 30 and about upper portions of raised design area 44.

Raised design areas 44, 45, 46, 47, 48, and 49 are all formed with a third set of yarns or additional threads which are interlaced with base fabric 26 at three layers or at a third level of thickness. Design areas 44, 45, and 46 are formed below vertical cutouts 30 and above horizontal cutouts 36. These yarns are interlaced with or stitched to base fabric 26 in repetitive patterns formed to three layer thickness. Also, repetitive patterns 47, 48 are formed along the upper edge and between the cutouts at the same level of thickness. Finally, raised pattern 49 which is sculptured is formed with the lower edge of base fabric 26 utilizing also the third set of yarns interlaced at three layer thickness.

Figure 8:
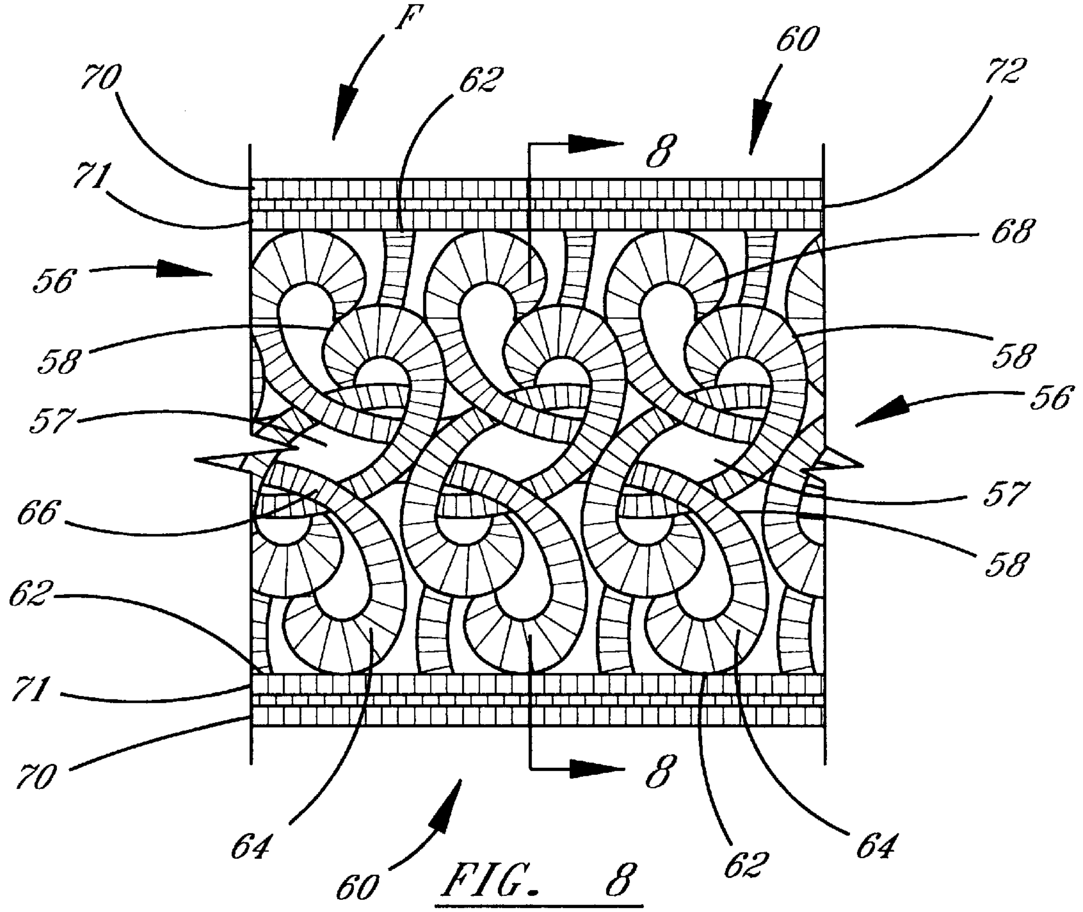
FIG. 8 is a top view of a third embroidery design used as a border strip.
Figure 9:
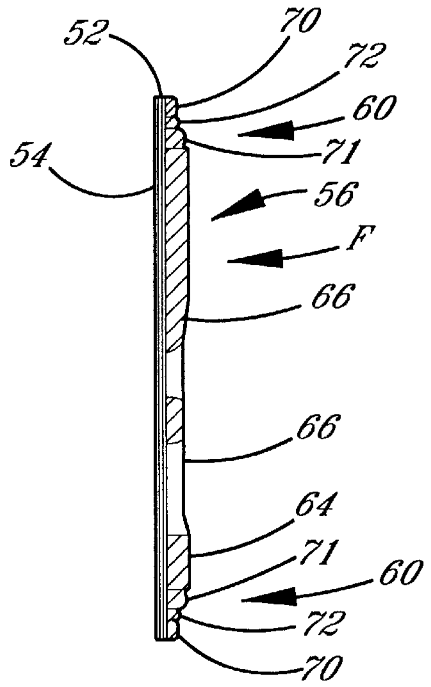
FIG. 9 is a sectional side view taken along lines 8—8 of FIG. 8.

Finally, turning to FIGS. 8 and 9 and the embroidered structure of embroidered wall strip F. In this arrangement the embroidered structure is formed using a backing fabric formed of dissolvable material to which stitching or interlacing of the multi-layered configurations and longitudinal interconnecting raised strips is applied. The raised strips and configurations are formed using non-dissolvable threads. After forming, the base fabric is dissolved out leaving the embroidered fabric as shown.

The embroidered fabric of FIG. 8 comprises a plurality of interlaced or stitched threads formed into a plurality of crook shaped or crescent shaped configurations 56 interconnected with each other at selected locations 58 and interconnect with longitudinal edge stripe 60 at 62. A plurality of transparent or open pattern areas 57 are formed about configuration 56 and along the embroidered strip. Longitudinal edge strips 60 are formed with a raised inner stripe 71 and a raised outer stripe 70, each strip being no more than two layers thick. A single layer strip 72 separates stripes 70, 71 along their length.

Each crook shaped configuration 56 includes a main body portion 64 which is formed to be three layers thick. From here, the configuration tapers in a first direction into a first end shaped portion 66 which gradually diminishes in thickness to two layers thick. The configuration extends from body portion 64 in the opposite direction to form a second end shaped portion 68 which retains a thick of subs three layers until it merges with an adjacent configuration. The second end portion tapers to a two layer thickness.

Obviously many other embroidery designs are known and may be used to form embroidered strips. The particular design is considered to be a matter of choice.

Figure 4:
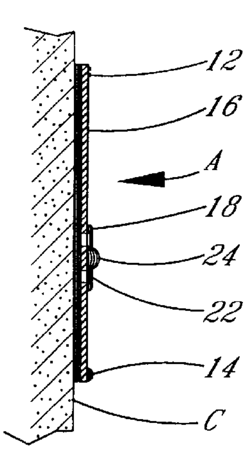
FIG. 4 is a sectional view taken along line 4—4 of FIG. 3 showing the embroidered wall strip in position on a wall.
Figure 5:
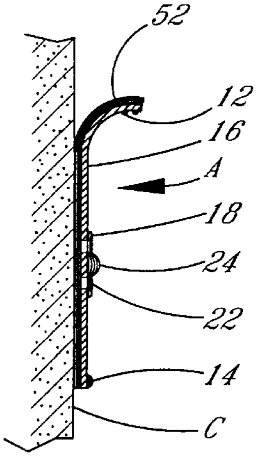
FIG. 5 is a sectional view similar to FIG. 4 showing the embroidered wall strip partially positioned on a wall.
Figure 6:
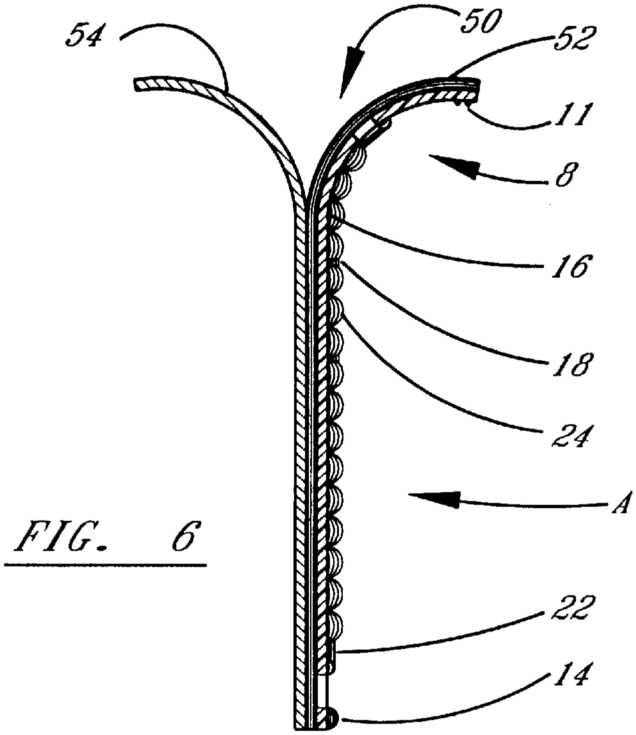
FIG. 6 is a sectional side view similar to FIGS. 3 and 4 showing the non-adhesive paper strip being removed.

Embroidered wall strip A has an adhesive mounting strip 50 secured to its rear surface as best seen in FIGS. 4 through 6. Adhesive strip 50 consists of transparent adhesive strip 52 having secured on one side a removable non-adhesive strip 54. Transparent adhesive strip 52 is permanently secured with the back side of embroidered strip 8 usually with heat and pressure. In this condition embroidered wall strip A is formed to be packaged and shipped.

Figure 3:
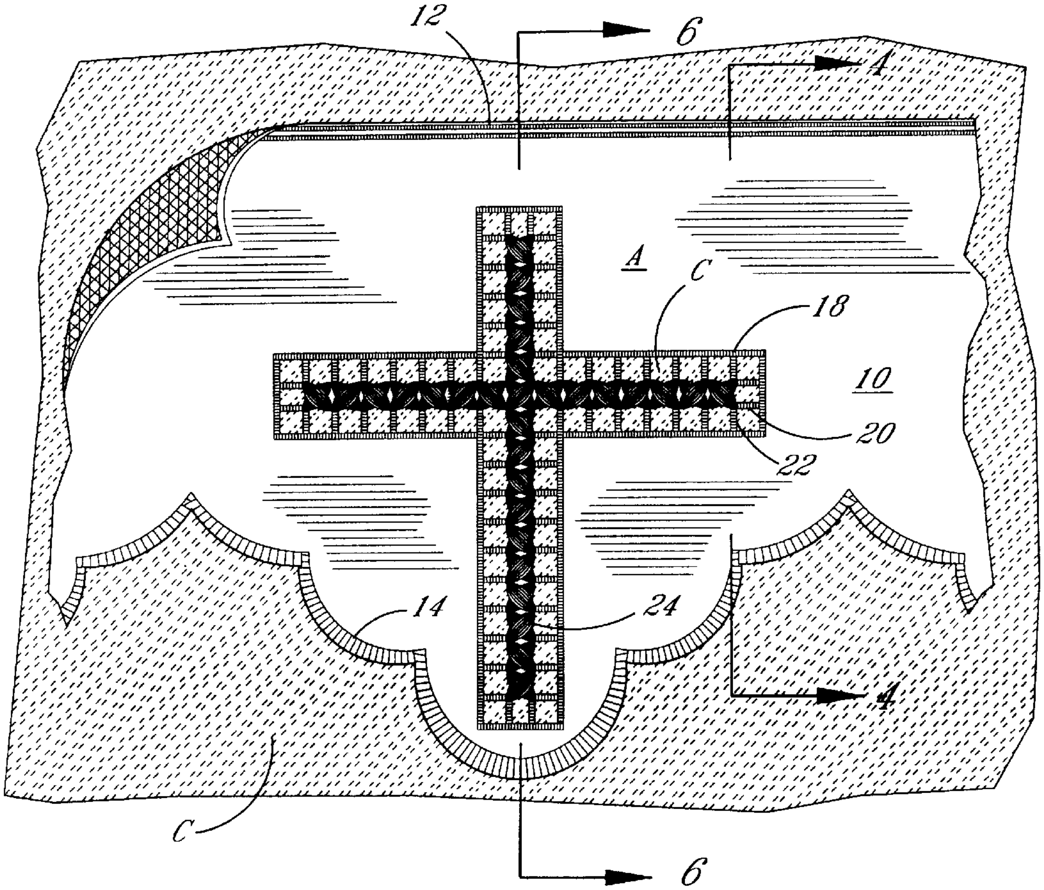
FIG. 3 is a sectional top view of the embroidered border strip of claim 1 as applied to a wall.

In use, strip 54, which may be paper or other suitable non-adhesive material, is peeled away as shown in FIG. 6 leaving an exposed adhesive surface of transparent adhesive strip 52. Embroidered border strip A is then positioned against a wall, such as indicated at C in FIGS. 3, 4, and 5 and is pressed into position. The transparent adhesive strip 52 securely holds embroidered wall strip A in position.

Because of the transparency of transparent strip 52, the color and texture of wall C can be seen through openings 16 the wall thus, adding another dimension or background to the open area and enhancing the decorative effect of embroidered border strip A.

It is noted that adhesive strip 50 is a commercially available product having sold under various brand names. Acrylic pressure-sensitive adhesive film is an acceptable product.

It is desirable to coat the outer surface of the embroidered border strip with a waterproof sealer, such as a clear liquid acrylic sealer or heat sealed polyurethane which renders the outer exposed surface of adhesive strip 50 not tacky and prevents the fabric from absorbing impurities in the air and becoming discolored. Also, the coating allows cleaning of the border strip with usual wall cleaning detergents.

Figure 7:
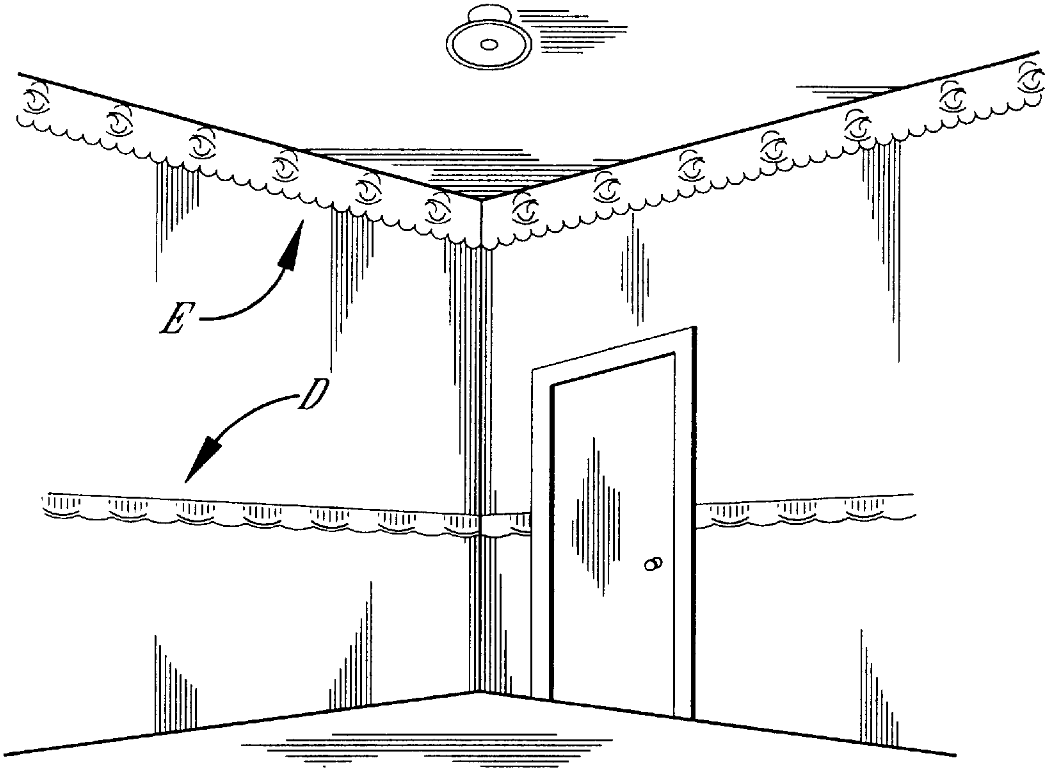
FIG. 7 is a sectional view showing wall areas decorated with the embroidered border strip of the invention.

The embroidered wall strip of the invention may be used as desired. FIG. 7 shows two examples of areas at D and E of the wall it most commonly employed.

What is claimed is:

1. A room wall decorative border strip adorning a room wall having a non-adhesive face surface comprising:

a three dimensional embroidered strip having yarns inter-engaged in a repetitive pattern of a plurality of configurations formed in varying thicknesses, said configurations being longitudinally arranged along said embroidered strip with inter-engaging points separated by open repetitive pattern areas there between;

a transparent adhesive strip secured on one side with a rear surface of said embroidered strip along its length, said transparent adhesive strip extending over said open pattern areas forming a part of said face surface;

an adhesive surface formed on a second side of said transparent adhesive strip; whereby, said open pattern areas and said transparent adhesive strip allow selected wall portions to be visible and form a background for said open pattern areas when said border strip is adhered with said wall.

2. The border strip of claim 1 wherein said face surface includes a clear lacquer coating.

3. The border strip of claim 1 wherein said face surface includes a clear plastic coating.

4. The border strip of claim 1 wherein said configurations include a plurality of yarns inter-engaging to form three layered non-transparent pattern areas, said three layer non-transparent pattern areas being interspersed along the length of said base fabric.

* * * * *